United States Patent [19]
Buzga

[11] Patent Number: 5,303,826
[45] Date of Patent: Apr. 19, 1994

[54] METHOD AND APPARATUS FOR SEPARATING DIFFERENT PLASTIC PRODUCTS

[75] Inventor: Heinrich Buzga, Grevenbroich, Fed. Rep. of Germany

[73] Assignee: REFAKT Anlagenbau GmbH, Willich, Fed. Rep. of Germany

[21] Appl. No.: 929,317

[22] Filed: Aug. 13, 1992

Related U.S. Application Data
[63] Continuation-in-part of Ser. No. 654,753, Feb. 13, 1991.

[30] Foreign Application Priority Data
Feb. 13, 1990 [DE] Fed. Rep. of Germany ....... 4004300

[51] Int. Cl.$^5$ ............................................. B07B 13/00
[52] U.S. Cl. ....................... 209/46; 209/689; 209/693; 209/695; 209/700
[58] Field of Search ............ 209/11, 45, 46, 700, 209/689, 692, 693, 694, 695

[56] References Cited

U.S. PATENT DOCUMENTS
| | | | |
|---|---|---|---|
| 3,599,788 | 8/1971 | Fyfe | 209/11 |
| 4,141,450 | 2/1979 | Clin et al. | 209/700 X |
| 4,593,603 | 6/1986 | Johnson | |
| 4,892,647 | 1/1990 | Liddle et al. | 209/11 |

FOREIGN PATENT DOCUMENTS
| | | |
|---|---|---|
| 2525750 | 4/1982 | Fed. Rep. of Germany |
| 2804729 | 3/1985 | Fed. Rep. of Germany |
| 3722777 | 1/1989 | Fed. Rep. of Germany |
| 1284605 | 8/1985 | U.S.S.R. |

*Primary Examiner*—David H. Bollinger
*Attorney, Agent, or Firm*—Horst M. Kasper

[57] ABSTRACT

A method and an apparatus for separating of different plastic products, which plastic products are comminuted, purified, and dried in a conventional way. The dry particles are fed to a heated, movable support base. Plastic particles, having a lower softening point, adhere to the support base, and particles having, a higher softening point, flow freely over the particles adhering to the moving support base and can be separated. After separation of these particles, the adhering particles are scraped from the steel belt.

15 Claims, 6 Drawing Sheets

METHOD AND APPARATUS FOR SEPARATING DIFFERENT PLASTIC PRODUCTS

CROSS-REFERENCE TO RELATED APPLICATIONS

This application is a continuation-in-part application of another application filed Feb. 13, 1991 and bearing Ser. No. 07/654,753. The entire disclosure of this latter application, including the drawings thereof, is hereby incorporated in this application as if fully set forth herein.

BACKGROUND OF THE INVENTION

1. Field of the Invention

The invention relates to a device for the separation of soiled plastic products, having different softening points, which are comminuted, purified and dried through an intermediate storage with a feed device disposed above a heated steel tape and where the plastic materials are placed onto the steel tape in a thin layer, wherein the steel tape is furnished with one or several vibrators and where the vibrator is just attached SUCH that the free-flowing plastic particles with the different softening points are transported over the steel tape and are caught in different catch devices.

2. Brief Description of the Background of the Invention Including Prior Art

Such methods are used for the reprocessing and reutilization heavily soiled plastic products, such as is described, for example, in the German Patent DE-PS 25 25 750.

According to a conventional separating device, taught in the Soviet Union Patent SU 12 84 605 A1, the plastic particles to be separated are placed with the aid of a hot air stream onto a vibrating but otherwise thick steel bands and the different plastic particles are transported in opposite directions with the aid of the vibration forces. The support and transporting air is heated such that the temperature of the plastic particles remains below the softening temperatures. It is intended with this that the plastic particles do not adhesively attach to steel tape. Based on this step the different plastic particles are to be moved on different fly paths. This is associated with the disadvantage that the steel tape can be covered only in one layer with the plastic particles. In case of multi-layer covering of the steel tape, the fly paths of particles are interfered with. A further disadvantage of the older device is associated with a situation that the hot support air swirls the plastic particles and consequently renders a separation of the individual plastic materials more difficult.

The separation of comminuted plastic waste materials including materials with a higher specific weights and lower specific weights as employing a washing liquid is described in the German Patent DE-PS 28 04 729. In this case the separation is performed by a wet-sinking method. (U.S. patent application Ser. No. 07/406,154, filed Sep. 12, 1989).

In contrast, soiled different plastic products are generated, where the specific weights are closely together such that wet-sink separation after the comminution is not possible. Thus, soiled plastic formed parts such as bottles, boxes and the like, are generated, which are made of polyester (PET) and polyvinylchloride (PVC). The two materials have nearly the same specific weight.

In order to separate such materials having different softening points but nearly the same specific weights such as recited and also for other materials, such materials are placed onto conveyor belts before the recycling and are manually separated. Based on a human error, even in this case, a hundred percent separation is not possible. In order to reduce error sources an X-ray beam radiation method has been employed. The beams can detect plastic parts containing chlorides and are thus capable to allow a separation of polyvinylchloride (PVC) from polyester (PET). Apart from the high cost and the danger of the radiation for the personnel, even in this case a hundred percent separation is not possible. For example, the formed an molded parts are furnished with adhesive labels, and in this case the radiation cannot any longer capture the plastic material such that also materials without chloride components are treated like polyvinylchlorides.

The German Printed Patent Document DE 37 22 777 A1 teaches a device for the sorting of thermoplastic, plastic parts from stream of mixture, employing a heated circulating steel tape. Parts of the plastic particles adhesively adhere to the steel tape. The particles not adhering are separated. According to this older device, the plastic parts to be separated are transported through a cascade arrangement in steps. The cascade causes not only a high in expenditure investment but also it cannot be prevented that the parts of the plastic to be separated remain always at the surface of the flow of the mixture and consequently these parts do not pass through the surface of the steel tape. A secure separation is thus not assured.

SUMMARY OF THE INVENTION

1. Purposes of the Invention

Starting from the subject matter according to the Soviet Union Patent Document SU 12 84 605, it is an object of the present invention to provide a device, which allows separation of different plastic materials with a certainty from each other.

It is an object of the present invention to provide a method for a reliable separation of different plastic products.

It is yet another object of the invention to provide an apparatus which employs simple means for separating plastic materials of different chemical compositions.

It is yet a further object of the present invention to provide a separation of plastic waste products for recycling, where a high degree of chemical uniformity is achieved for the separated components.

These and other objects and advantages of the present invention will become evident from the description which follows.

2. Brief Description of the Invention

The invention method for separating soiled plastic products, having different softening points, comprises the following steps.

The plastic materials are comminuted to form plastic particles. The plastic particles are purified. The comminuted and purified plastic materials are fed to an intermediate storage for assuming a substantially dry state. The dry plastic particles are moved from the intermediate storage onto a heated moving support base to form a thin layer on the heated moving support base,. The temperature of the support base is set such that the plastic particles, having a lower softening point, adhere to the surface of the support base. The temperature is such that the plastic particles, having a higher softening point, can freely move over the particles adhering to the support base. The freely moving particles are subjected to a separating force for separating the freely moving particles from the support base. The freely moving particles are collected after separation from the support base. The adhering particles are mechanically removed from the support base.

The support base can be moved along a closed path. The support base can be heated from the inside of the support base.

According to present invention, the steel tape is guided as an endless thin band over deflection rollers and is heated from below with a radiation heater such that the plastic particles with the lower softening points adhere to the steel tape and can be scraped from the steel tape with a scraper and that based on a setting or adjusting vibrator, setting the plastic particles with the higher softening points can be transported opposite to the rotation direction of the steel tape or over the fixed particles and can fall into a catch device at the end of the steel tape, wherein the steel tape is driven by a reversible continuously controllable motor.

Heat transfer from a hot gas to the support base can be employed for heating the support base. The support base can be irradiated with infrared radiation for increasing the temperature of the support base.

If the temperature of the steel tape has been set such that the plastic particles having the lower softening point adhere to the surface of the steel tape, then the plastic particles with the highest softening point can freely move over the steel tape and can be led away and discharged at one end of the steel tape. The plastic particles adhering to the steel tape are removed from the steel tape at the other and/or at the same end of the steel tape. This means, for example, that polyvinylchloride (PVC) particles adhere and thus the polyester particles can freely move. The temperature of the support is set such that the non-plastification point is exceeded such that the polyvinylchloride particles adhere at the support steel band and consequently this material can be scraped of from the support steel band after the separation of the other component without difficulties.

The direct heating of a steel tape is performed with the aid of a radiation heater, which is disposed within the steel tape, wherein the heating radiation irradiates directly on the bottom side of the steel tape. Advantageously, an infrared radiator is employed.

The free flowing plastic particles are continuously swirled and jolted with the aid of a vibrator and therefore continuously rearranged. This step achieves that nearly all particles with the lower softening points are uniformly distributed and pass to the heated surfaces of the steel tape and adhere to the steel tape. This is again associated with the advantage that the particles can also be placed in several layers onto the steel tape without disadvantageously interfering with the separation effect and consequently the separating power of the separating device is increased as compared to the known devices.

The freely moving particles can be caught in a region of a slope of the support base in a downward direction. Subsequently, the adhering plastic particles can be forcibly from the support base. The freely moving plastic particles of a higher softening point can be subjected to a further separating treatment after their collection.

The direction of motion of the freely moving particles substantially opposite to the motion of the support base with the adhering particles can be maintained such that a counter-current separation process occurs between the adhering and the non-adhering particles.

The rotating heated endless steel tape is controllably driven such that the dwelling time of the plastic particles on the steel tape varies and thus can be adapted to the actual situation.

The dwelling time of the plastic particles and the steel tape can furthermore be varied by an inclined position of the separating device. For this purposes a steel tape is supported with its deflection rollers on one side higher adjustable frame.

The invention further provides for an apparatus for separating plastic particles based on differences in thermal plastification temperatures among the plastic particles. An endless moving element forms a support base. Heating means are disposed inside of the endless moving element. A hopper is disposed above the endless moving element for supplying plastic particles to form a thin layer of plastic particles on the moving element. A first force means separates loose particles from the support base. A first catch bin is disposed in the path of the separated loose plastic particles for collecting the loose plastic particles separated from the support base. A second force means matches and engages the surface of the endless moving element for separating plastified plastic particles adhering to the support base. A second catch bin is disposed in the path of the separated plastified plastic particles for collecting the separated plastified plastic particles.

The endless moving element can be furnished by a rotating drum element having a horizontally disposed rotation axis. The heating means can be provided by a hot air nozzle. The second force means can be furnished by a removal device disposed below the horizontally disposed rotation axis.

The hopper can be disposed immediately next to the highest point of the drum. A conduit can be provided for feeding hot air to the heating means. The heating means can be formed as a wide hot-air nozzle. Said hot air nozzle can be connected to the conduit for feeding-in of hot air. A second drum can follow the first drum. The first catch bin of the first drum can be connected to a second hopper for feeding material to the second drum. A main conduit can furnish hot air. A branch conduit can be connected to the main conduit for receiving hot air from the main conduit. The heating means can be provided by a wide nozzle and can be connected to the hot-air conducting branch conduit. The endless moving element can be furnished by a steel belt conveyor guided over two deflection rollers. The hopper can be disposed above a moving surface of the steel belt conveyor. A hot-air box, having an upper wall, can be connected to a branch hot-air conduit. The hot-air nozzle can be disposed in the upper wall of the hot-air box.

The steel conveyor belt can be supported on a vibrator. The vibrator can be set such that the free flowing plastic particles, having a higher softening point, are movable against the rotation direction of the steel belt. The first catch bin can be disposed at a first end of the steel conveyor belt relatively more remote from the hopper. The second catch bin can be disposed at a second end of the steel conveyor belt.

According to the invention, the dry plastic particles from an intermediate storage are placed in a thin layer onto a heated, moving support base. The temperature of the support base is such that the plastic particles, having a lower softening point, adhere to the surface of the support base such that the plastic particles, having a higher softening point, move freely over the particles adhering to the surface of the support base and can be collected and caught in the area of an inclined slope of the support base after a free fall in a downward direction. The attached plastic particles can then be scraped from the support base.

According to this method, the plastic particles, having a lower softening point, are slightly plastified and can consequently adhere to the surface of the support base. This means that, for example, polyvinylchloride (PVC) particles adhere and that the polyester particles can thus move freely. The temperature of the support base is set such that the known plasticizing point in principle is just reached and that consequently this material can be scraped from the support base without difficulties after the separation of the other components.

It can also occur that polyester (PET) particles rest on the surface of the support base and that polyvinylchloride (PVC) particles come to rest on top of them, where the polyvinylchloride (PVC) particles are then caught jointly with the polyester (PET) particles. The remaining polyvinylchloride particles can then be separated in a further separating stage.

The invention is not limited to the specific example of the separation of polyester (PET) particles from polyvinylchloride (PVC) particles. Other materials, such as, for example, polystyrene (PS) or the combination of polyvinylchloride and polystyrene (PVC/PS) can also be separated from polyester (PET). In addition, hot-melt materials can be separated from polyester (PET).

The invention is not tied to the described example referring to the separation of polyester particles and polyvinylchloride particles. Also other materials such as polystyrol or a combination of polyvinylchloride polystyrol can be separated from polyester particles. In addition hot-melt adhesives can be separated from polyester.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
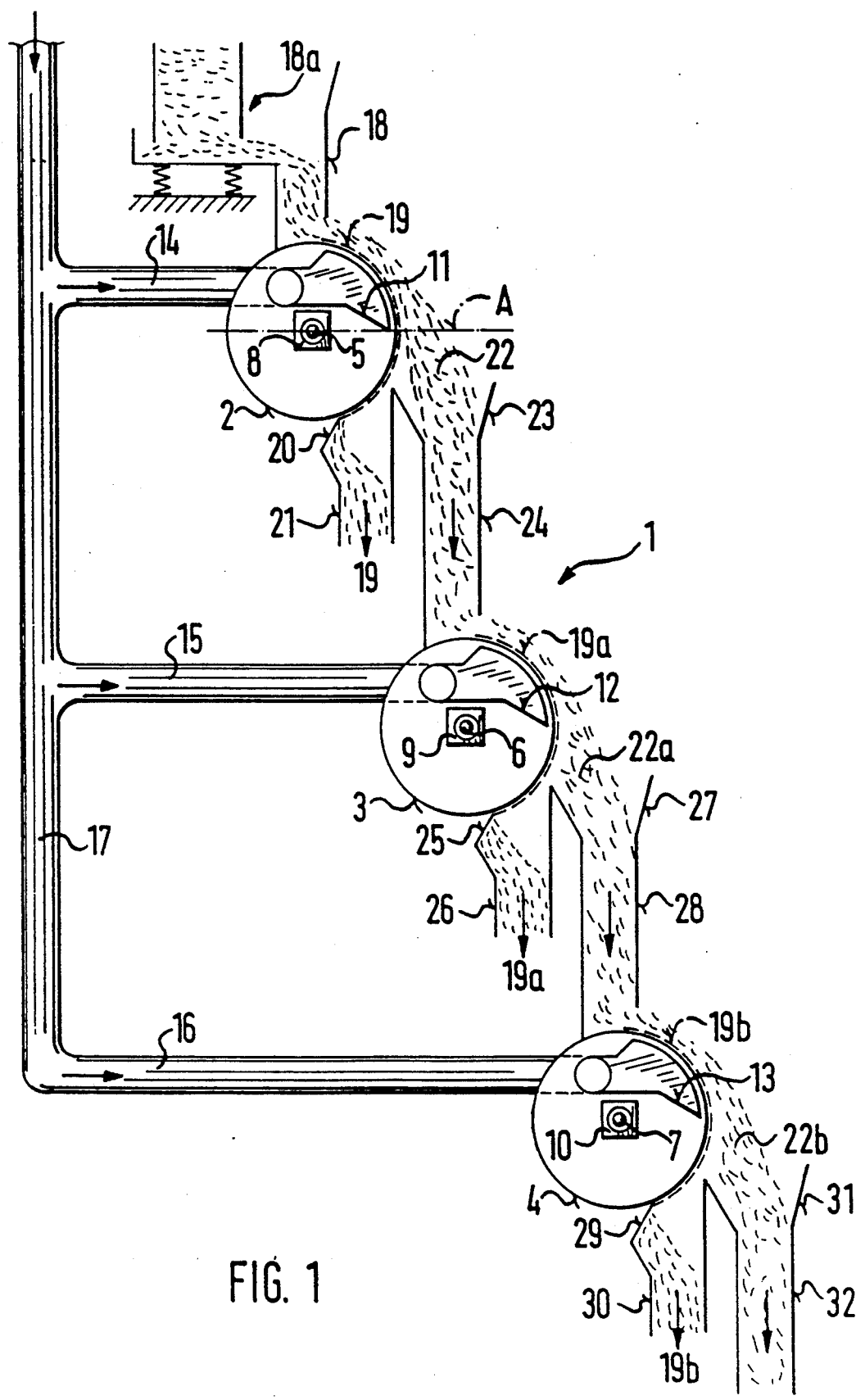
FIG. 1 is a side-elevational view of the device including three drums disposed on top of each other.
Figure 2:
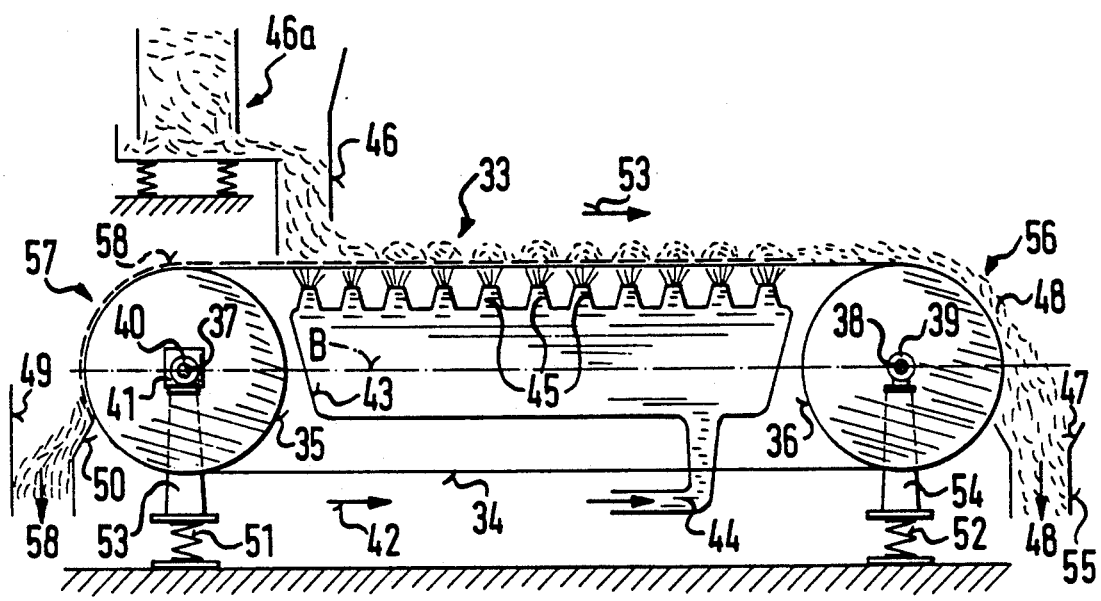
FIG. 2 is a side-elevational view of the apparatus including a circulating steel belt conveyor.

According to the present invention, there is provided for a method for separating soiled plastic products having different softening points. The plastic products are comminuted, purified, and fed over an intermediate storage to a further processing. The dry plastic particles are placed from the intermediate storage in a thin layer onto a heated moving support base. The temperature of the support base is set such that the plastic particles, having a lower softening point, adhere to the surface of the support base, such that the plastic particles, having a higher softening point, can freely move over the particles adhering to the support base and can be caught in the region of a slope of the support base in a downward direction. The adhering plastic particles are subsequently removed from the support base.

The plastic particles, having a higher softening point, can be subjected to one or several further separating treatments after their catching.

The support base can be moved along a closed path and can be heated from the inside. The heating can occur by way of hot air, infrared radiation and the like.

The present invention further provides for an apparatus for performing the above-recited method. The support base 2–4, or 34, respectively, is formed by a heated rotating element. Said element is furnished in its interior with one or several hot-air nozzles 11–13, or 45, respectively. A hopper 18, 46 is furnished above the rotating element. A catch bin 23, 27, 31, 47 and a removal device 21, 26, 30, 49 are furnished below the horizontal axis A, or B, respectively.

The rotating element can be comprised of a drum 2. The hopper 18 can be disposed at the highest point of the drum 2. The hot-air nozzle can be formed as a wide nozzle 11 and can be connected to a conduit 14 for a feeding-in of hot air. The drum 2 can be followed by one or several drums 3, 4. The catch bin 23, 27 of the preceding drums 2 or 3, respectively, can be connected to the device 24, 28 of the following drum 3 or 4, respectively. The conduits 14–16 to the wide nozzles 11–13 can be connected to a hot-air-conducting main conduit 17.

The rotating element can be furnished by a steel belt conveyor 34 guided over deflection rollers 35, 36. The hopper 46 can be disposed above the carrying run of the steel belt conveyor 34. The hot-air nozzles 45 can be furnished in the upper wall of a hot-air box 43, to which a conduit 44 carrying hot air can be connected. The steel conveyor belt 34 can be supported on one or several vibrators 51, 52. Said vibrators 51, 52 are set such that the free-flowing plastic particles, having a higher softening point, can be movable against the rotation direction 42 of the steel belt 34. The catch bin 47 can be disposed at a first end 56 of the steel conveyor belt 34 more remote from the hopper 46. The catch bin 49 can be disposed at a second end 57 of the steel conveyor belt 34.

A three-stage apparatus is illustrated in FIG. 1. A single-stage device can alternatively be employed and furnished instead.

The separating apparatus 1 comprises three drums 2, 3, 4 which, in each case, are supported on shafts 5, 6, 7, and are rotated by drives 8, 9, 10. Wide nozzles 11, 12, 13, are furnished on the inside of the drums 2 through 4. The wide nozzles 11, 12, 13, are connected via a main conduit 17 to the hot air conduits 14, 15, 16. A feeder or hopper 18 with a predisposed silo bin 18a is furnished above the upper drum 2. The jointly comminuted, purified, and dried distinguishable plastic products are placed onto the surface of the drum 2 via the hopper 18. Based on their plastification, the polyvinylchloride (PVC) particles 19 adhere to the surface of the drum 2 and are scraped from the drum by way of a scraper 20 of the removal device 21 and are further transported. Instead of the scraper, a rotating steel brush or the like can also be used for brushing the adhering polyvinylchloride (PVC) particles from the drum surface.

The free-flowing polyester (PET) particles 22, possibly with residual (PVC) particles 19 drop into the bin 23. The parts 20 and 23, i.e. the scraper 20 and the catch bin 23, are disposed below the bevel A. The particles pass from the catch bin 23 into a hopper 24 for the drum 3. Again a separation of the particles 19a and 22a is performed by way of the scraper 25 of the removal device 26 and by way of the catch bin 27. A third separating process is performed by way of the drum 4, the scraper 29 of the removal device 30 and by way of the catch bin 31. Pure polyester (PET) particles can be withdrawn and taken from the conduit 32.

A steel belt conveyor 34 of the separating apparatus 33, and running over deflection rollers 35, 36, can be employed instead of the three drums 2, 3, 4. The deflection rollers 35, 36 are supported on shafts 37, 38 with bearings 39, 40. The steel belt conveyor 34 is driven by way of a motor 41 in an operating direction according to the arrow 42 A hot-air box 43 is furnished in the inside of the steel conveyor belt 34, which hot-air box 43 is connected to a hot-air conduit 44. Air nozzles 45 for a heating of the steel belt conveyor 34 are disposed in the upper part of the hot-air box 43. A feed device or a hopper 46 with a predisposed silo bin 46a is disposed in the region between the two deflection rollers 35, 36 and above the steel conveyor belt. The hopper 46 places the comminuted, purified, and dried different plastic products onto the steel belt conveyor 34 in a thin layer. Below the axis 3, there are disposed, on the one hand the catch bin 47 for the polyester (PET) particles and, on the other hand, removal device 49 with the scraper 50 for the PVC particles 58. The complete apparatus 33 is supported by way of supports 53, 54 on two unbalanced mass vibrators 51, 52. These unbalanced mass vibrators are set such that the free-flowing polyester PET particles 48 obtain a transport direction according to the arrow 153. Vibration and position of the separation apparatus 33 can be set such that the PET particles move, based over the steel belt conveyor along a predetermined drop parabola. It is thereby achieved that all polyvinylchloride (PVC) particles 58 come to contact with and adhere to the hot steel conveyor belt 34. Consequently, the separating apparatus 33 can be operated such that only polyester (PET) particles can be withdrawn from the line 55. The complete and correct separation of polyester (PET) particles and polyvinylchloride (PVC) particles or other components is achieved based on different directions of motion of the two materials on the steel belt conveyor 34.

Figure 4:
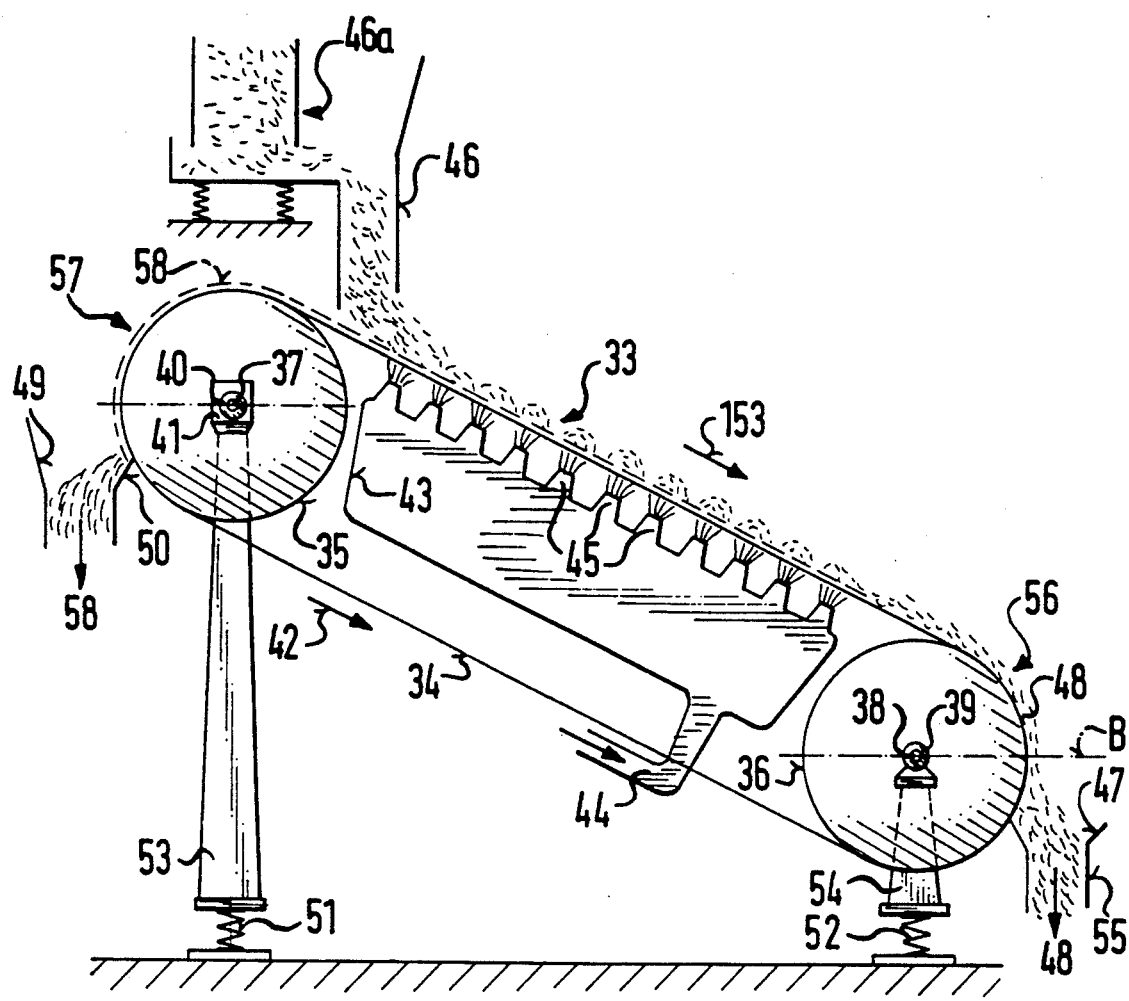
FIG. 4 is a view of an embodiment similar to FIG. 2, however employing counter-current separation.

In order to provide a larger separation effect between the polyester (PET) and polyvinylchloride (PVC) particles, the apparatus of FIG. 4 can be placed such that the belt receiving the particles is running at an angle. This angle can serve to move the adhering particles uphill and to allow the non-adhering particles to fall.

Figure 3:
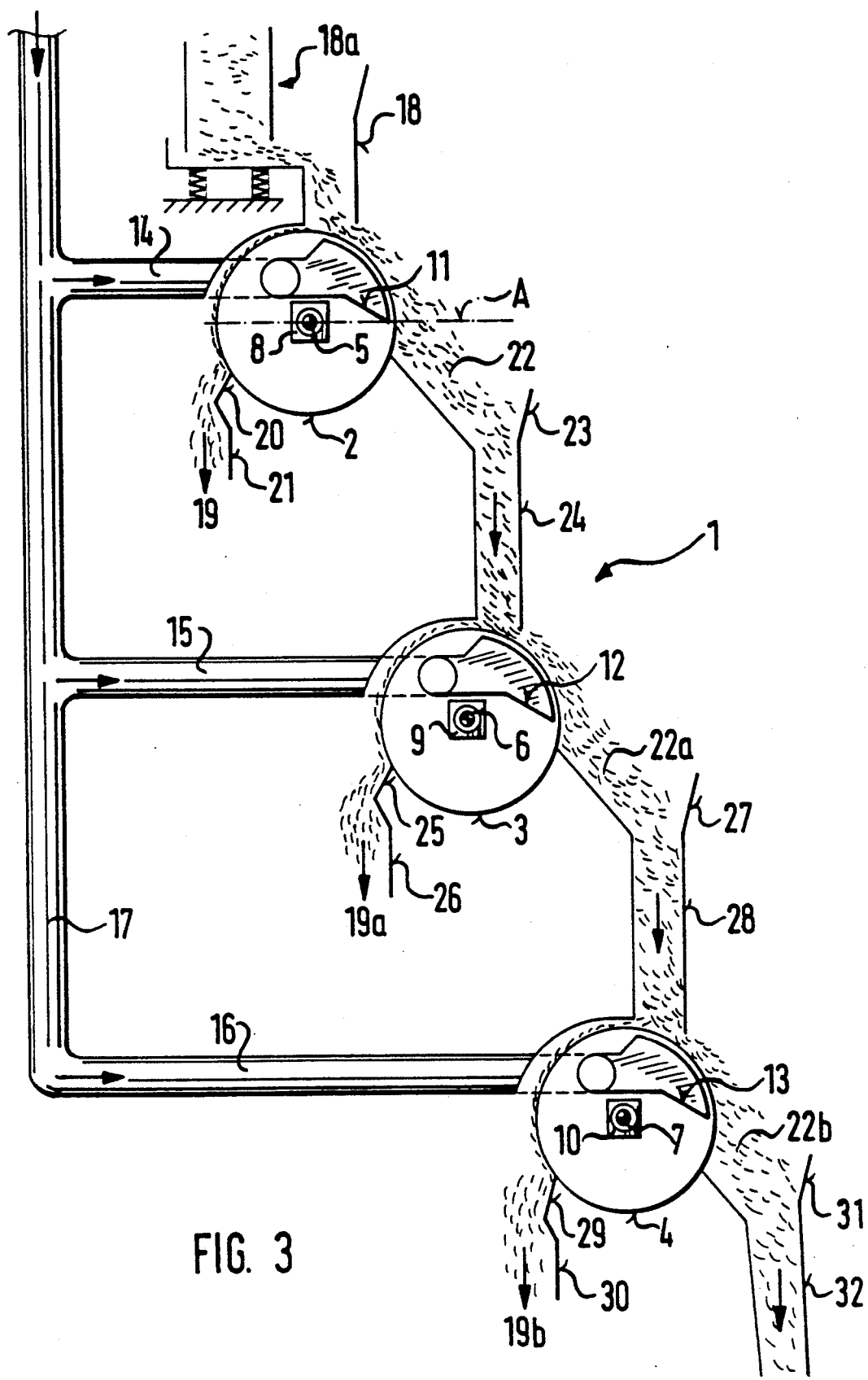
FIG. 3 is a view of an embodiment similar to FIG. 1, however employing counter-current separation.

While FIG. 1 shows that the drums are rotated in a tangential direction parallel to the direction of movement of the falling particles, it is also possible to reverse the direction of the drums as illustrated in FIG. 3. Then, the falling particles will continue to fall along the side of the drum, whereas the particles adhering to the drum will move in an opposite direction. Since the adhering particles are moved opposite to the normal flow of the fed particles, this method achieves that a counter-current effect insofar as the mass flow depleted in the softening plastic particles encounters a fresh surface of the drum for possible plastification and adhesion. Thus, the method is suitable for a counter-current separation of different materials having different softening-points.

In order to achieve an even higher ratio of separation it, is possible to specifically prepare the surface of the drums .or of the belts, such that the softening particles adhere easily. Of course, such preparation of the belt will depend on the size of the particles. For example, the drum could be furnished with grooves and/or protrusion edges formed as triangles, where the distance between two neighboring protruding triangles can be from about 0.1 to 0.7 of the average particle size of the material to be separated. The presence of the grooves or protrusions allows to focus the heat into certain areas of the particles contacting the steel belt and to provide an enhanced adhesion as compared to a smooth surface belt. The removal takes place in this case by a counter-belt type structure, which combines a rotary motion with sideways motion such that the adhering particles are sideways removed from the rolling drum in a direction parallel to the axis of the shaft.

For a counter-current separation, a preferred average angle of inclination of the device can be from about 30 to 60 degrees versus the horizontal.

The embodiments of FIG. 1 can be further modified by employing different temperatures in connection with different drums. For example, the drum 2 could have a temperature lower as compared to the drum 3, and again the drum 4 could have the highest temperature. Then it would be possible not only to separate two components but several components based on plastic materials having different softening points, from any remaining materials present having a higher temperature plastification point. Thus, in principle, the embodiment of FIG. 1 can serve to separate four different kinds of plastic.

A casing with a section port/start 103 for gases and dust is placed onto a foundation 101. An endless thin steel band 107 circulating over a deflection roller 105, 106 is placed inside the casing 102 as separating device 104. The steel band 107 is formed such thin that it can be easily heated but on the other hand that the steel tape again rapidly cool.

Figure 5:
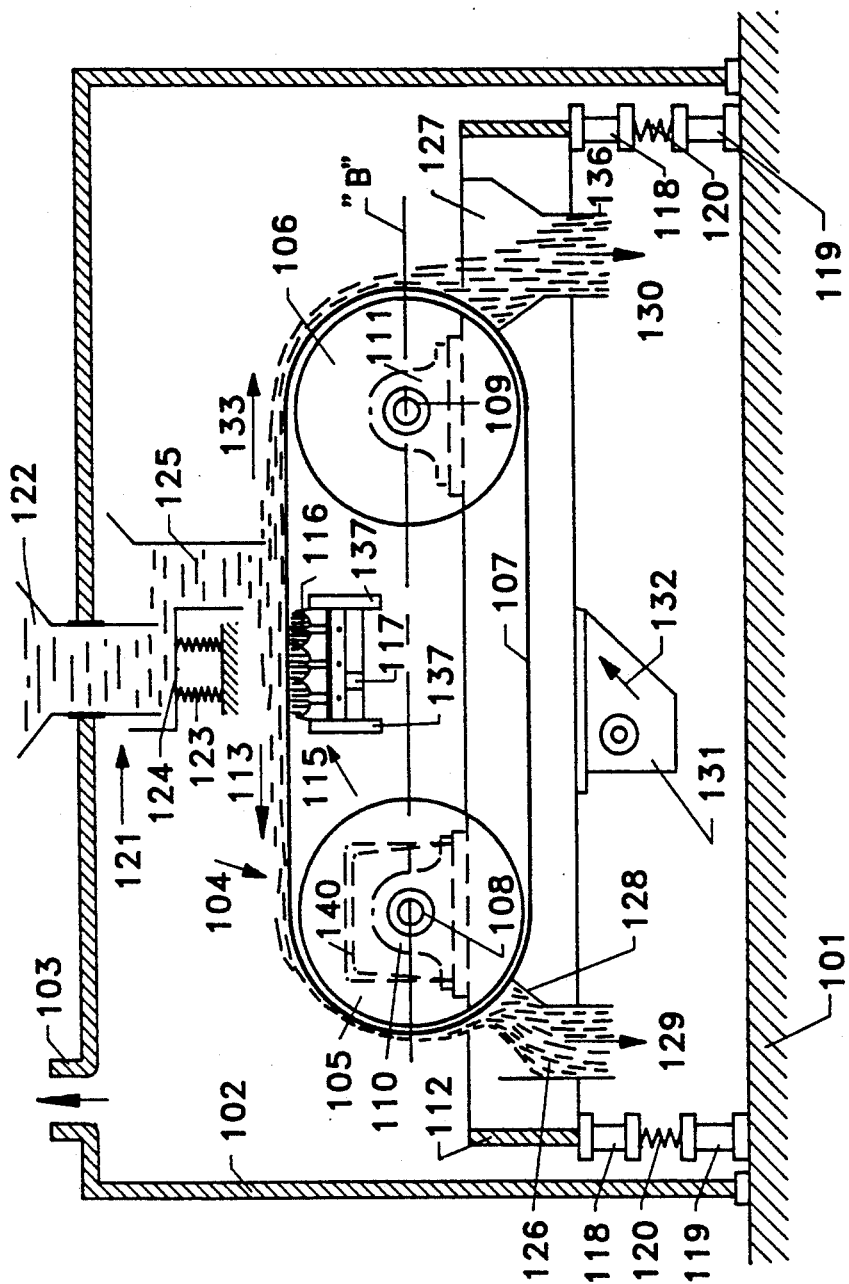
FIG. 5 shows a separating device with a schematic diagram of a separating device with a horizontal transport support.
Figure 6:
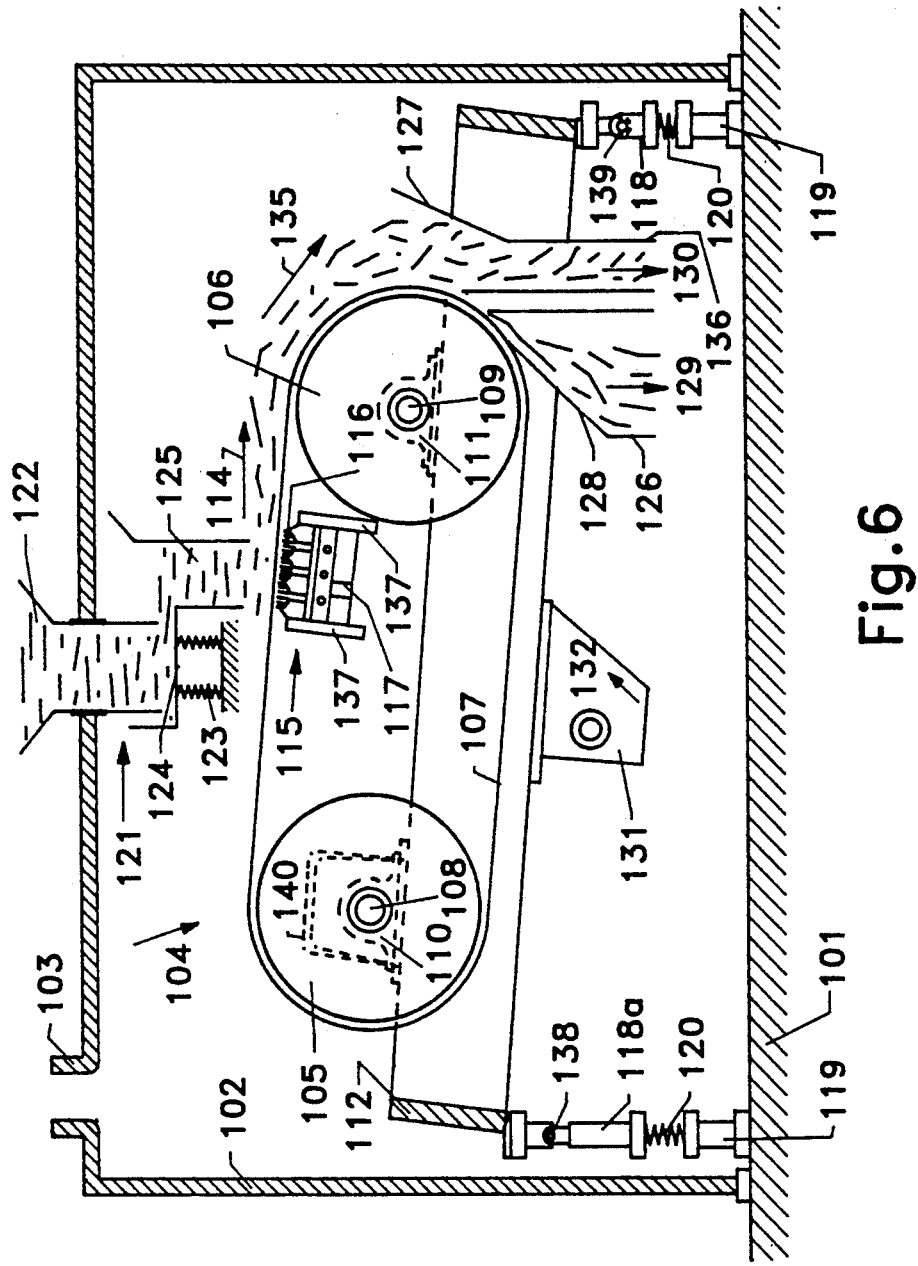
FIG. 6 shows a separating device with an inclined slope of the support steel band.

The deflection rollers 105, 106 are supported on shafts 108, 109 with bearings 110, 111, wherein the bearings 110, 111 in turn are attached to a frame 112. The frame 112 in each case is placed on top of two part supports 118, 119 and on top of a spring 120 onto a foundation 101. The FIG. 6 shows an inclined position separating device 104. According to this embodiment the left support 118a is extended. In order to set the change of the inclined position of the frame 112 during the operation or during the mounting, the hinges 138, 139 are furnished within the supports 118a, 118. The supports 118a are formed as hydraulic piston or the like. The steel tape 107 is driven with a motor 140 reversable in its drive direction and continuously controllable relative to rotation speed, the endless steel tape 107 is driven either in the running direction according to arrow 113, illustrated in FIG. 5 or in the running direction 114, illustrated in FIG. 6. A radiation heater 115 is furnished on the inside of the steel tape 107. For example, the radiation heater 115 can exhibit electrical radiators 116, which are connected through cable 117 to the electrical power grip. The radiators 116 are directed such they heat the steel tape from below. The radiation heater 115 is connected to the casing 102 through support element 137 such that the radiation heater 115 remains free from vibration. The radiation heater 115 heats only a short length distance of the thin steel tape 107, which is sufficient in order to heat the plastic particles with the lower softening point such that they adhere to the steel tape 107. The particles can sufficiently cool down while passing along the remaining distance of the steel tape. Feeding device 121 with a pre-positioned silo-storage 122 is disposed in the region between the two deflection rollers 105, 106 and above the steel tape 107. The comminuted, purified and dried different plastic products fed from different containers, not illustrated here, are placed onto the steel tape 107 in a thin layer with the supply device 121. A vibrating and jolting floor 124 supported by a spring 123 leads and guides the plastic material through a feed channel 125 to the steel tap 107 and takes care of a uniform distribution of the plastic particles on the steel tape 107, wherein the vibration forces optimize the distribution. The catch device 127 for the polyester particles 130, on the one hand, and the discharge device 126 with the scraper 128, on the other hand, are disposed below the axes B according to FIG. 4. An unbalance type vibrator 131 or an unbalanced mass vibration generator 131 is attached to the frame 112. The unbalanced mass vibration generator can, for example, be an asymmetrically accelerated vibrator such as described in the U.S. Pat. No. 4,593,603. The unbalanced mass vibration generator is set such that the freely flowing polyester PET-particles move in case of a transport direction according to arrow 113 into a vibration direction according arrow 132, illustrated in FIG. 5, and thus the polyester particles obtain a transport direction according to arrow 133 of FIG. 6. In case of a transport direction according to arrow 114 illustrated in FIG. 6, the vibration direction again is set according to arrow 132, illustrated in FIG. 6 such that the polyester particles 130 obtain a transport direction according to arrow 135. In this case, the scraper 128 is furnished in the region of the catch device. The vibration can be set such that the polyester particles move by pre-determined throw parabola over the steel tape 107 and aerodynamic trajectory. The motion of the steel conveyor belt is superposed by an asymmetric motion showing cyclical temporary large acceleration of the belt in a direction opposite to the desired motion direction of the loose particles. The steel tape is asymmetrically accelerated such that the inertia of the freely moving particles induces these particles to stay behind and thereby move relative to the steel tape in a direction opposite to the cyclical rapid acceleration direction of the steel tape. This thus achieves that all polyvinylchloride particles 129 come into contact with the hot steel tape and adhere there. Consequently, the separating device 104 can be moved such that only polyester particles can be discharged and taken from the discharge line 136. The 100 percent separation of polyester particles from polyvinylchloride particles or other components is thus assured.

It will be understood that each of the elements described above, or two or more together, may also find a useful application in other method and device for the separating of different plastic materials differing from the types described above.

While the invention has been illustrated and described as embodied in the context of a method and device for the separating of different plastic materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An apparatus for separating plastic particles based on differences in thermal plastification temperatures among the plastic particles comprising
   an endless steel belt forming a support base;
   heating means disposed inside of the endless steel belt;
   a hopper disposed above the endless steel belt for supplying plastic particles to form a thin layer of plastic particles on the steel belt;
   a vibrator attached to the steel belt for moving loose particles over the steel belt;
   a first force means for separating loose particles from the support base;
   a first catch bin disposed in the path of the separated loose plastic particles for collecting the loose plastic particles separated from the support base;
   a scraper engaging the surface of the endless steel belt for removing and separating plastified plastic particles adhering to the steel belt;
   a second catch bin disposed in the path of the separated plastified plastic particles for collecting the separated plastified plastic particles.

2. The apparatus for separating plastic particles according to claim 1, wherein a second force means is furnished by a removal device disposed below the horizontally disposed rotation axis.

3. The apparatus according to claim 1, further comprising two deflection rollers, wherein the endless steel belt is guided over the deflection rollers, and wherein the hopper is disposed above a moving surface of the steel belt.

4. The apparatus according to claim 1, wherein the steel conveyor belt is supported on the vibrator, wherein the vibrator is set such that the free flowing plastic particles, having a higher softening point, are movable against the rotation direction of the steel belt, wherein the first catch bin is disposed at a first end of the steel conveyor belt relatively more remote from the hopper, and wherein the second catch bin is disposed at a second end of the steel conveyor belt.

5. The apparatus according to claim 1, wherein the steel belt conveyor (34) is guided over deflection rollers (35, 36);
   wherein the hopper (46) is disposed above the carrying run of the steel belt conveyor (34);
   wherein the steel conveyor belt (34) is supported on one or several asymmetric vibrators (51, 52), wherein said asymmetric vibrators (51, 52) are set such that the free-flowing plastic particles, having a higher softening point, are movable against the advance direction (42) of the steel belt (34), wherein the catch bin (47) is disposed at a first end (56) of the steel conveyor belt (34) more remote from the hopper (46), and wherein the catch bin (49) is disposed at a second end (57) of the steel conveyor belt (34).

6. The apparatus according to claim 1, wherein the steel belt is heated from the inside; and wherein the heating occurs by way of infrared radiation.

7. A device for the separating of soiled plastic products having different softening points, which are comminuted, purified and dried, and which can be brought in a thin layer via an intermediate storage onto a heated steel conveyor belt, guided over deflection rollers, wherein the charging device for the plastic products is disposed above the upper belt of the steel conveyor belt, wherein, the steel conveyor belt (34) is supported on at least one vibrator (51, 52), where the vibrator (51, 52) is set such that all free-flowing plastic particles having a higher softening point can be transported in a direction opposite to the average advance direction (42) of the steel belt (34), wherein a catch bin (47) is disposed at a first end (56) of the steel belt remote relative to the hopper (46), and wherein a discharge device (49) is disposed at a second end (57) of the steel belt (34).

8. Device for the separation of soiled plastic products with different softening points, comprising an intermediate storage, wherein the plastic products are comminuted, cleaned, and dried in the intermediate storage;

a frame having a bottom side;

a first deflection roller and a second deflection roller disposed on the frame;

a heated steel tape placed on the deflection rollers such that a rotation of the rollers cause a moving of the steel tape;

a hopper device disposed above a heated steel tape, wherein the comminuted, cleaned and dried plastic products are fed by way of the hopper device in a thin layer onto the steel tape;

a first catch device disposed in a path of separated free flowing plastic particles for collecting the free flowing plastic particles separated from the steel tape;

a symmetric vibrator attached the bottom side of the frame, wherein the asymmetric vibrator is set such that the free flowing plastic particles are transported over the steel tape and are caught in the first catch device, wherein the steel tape (107) is led as an endless thin band over deflection rollers (105, 106);

a second catch device disposed in the path of separated plastified plastic particles for collecting the separated plastified plastic particles;

a radiation heater (115) heating the steel tape from below such that the plastic particles (129) having a lower softening point adhere to the steel tape (107);

a scraper (128) scraping from the steel tape (107) the plastic particles 129 with the lower softening points, where the plastified plastic particles are caught in the second catch device;

a reversible and steplessly controllable motor (140) turning the deflection rollers.

9. Device according to claim 8, further comprising spring support means (118, 120);

shafts (108, 109) of the deflection rollers (105, 106) wherein the shafts are supported in bearings (110, 111) and wherein the bearings (110, 111) are supported on the frame (112), wherein the frame (112) is supported on a spring support means (118, 120).

10. Device for the separation of soiled plastic products with different softening points, comprising an intermediate storage, wherein the plastic products are comminuted, cleaned, and dried in the intermediate storage;

a frame hingedly attached to supports, wherein one of the supports is changeable in length;

a first deflection roller and a second deflection roller disposed on the frame;

a heated steel tape placed on deflection rollers such that a rotation of the rollers cause a moving of the steel tape;

a hopper device disposed above a heated steel tape, wherein the comminuted, cleaned and dried plastic products are fed by way of the hopper device in a thin layer onto the steel tape;

a first catch device disposed in the path of separated loose plastic particles for collecting free flowing plastic particles separated from the steel tape;

a asymmetric vibrator attached to a bottom side of the frame, wherein the asymmetric vibrator is set such that the free flowing plastic particles are transported over the steel tape and are caught in the first catch device, wherein the steel tape (107) is led as an endless thin band over deflection rollers (105, 106);

a second catch device disposed in the path of separated plastified plastic particles for collecting the separated plastified plastic particles;

a radiation heater (115) heating the steel tape from below such that the plastic particles (130) having a lower softening point adhere to the steel tape (107);

a scraper (128) scraping from the steel tape (107) the plastic particles (130) with the lower softening points, where the plastified plastic particles are caught in the second catch device;

a reversible and steplessly controllable motor (140) turning the deflection rollers.

11. Device for the separation of soiled plastic products with different softening points, comprising an intermediate storage, wherein the plastic products are comminuted, cleaned, and dried in the intermediate storage;

a frame hingedly attached to supports, wherein one of the supports is changeable in length;

a first deflection roller and a second deflection roller disposed on the frame;

a heated steel tape placed on deflection rollers such that a rotation of the rollers cause a moving of the steel tape;

a hopper device disposed above a heated steel tape, wherein the comminuted, cleaned and dried plastic products are fed by way of the hopper device in a thin layer onto the steel tape;

a first catch device disposed in the path of separated loose plastic particles for collecting free flowing plastic particles separated from the steel tape;

a asymmetric vibrator attached a bottom side of the frame, wherein the asymmetric vibrator is set such that the free flowing plastic particles are transported over the steel tape and are caught in the first catch device, wherein the steel tape (107) is led as an endless thin band over deflection rollers (105, 106);

a second catch device disposed in the path of separated plastified plastic particles for collecting the separated plastified plastic particles;
a radiation heater (115) heating the steel tape from below such that the plastic particles (130) having a lower softening point adhere to the steel tape (107);
a scraper (128) scraping from the steel tape (107) the plastic particles (130) with the lower softening points, where the plastified plastic particles are caught in the second catch device;
a reversible and steplessly controllable motor (140) turning the deflection rollers,
wherein the separating device (104) is placed into a casing (102) with an exhaust suction port (103).

12. A method for separating soiled plastic products having different softening points comprising the steps
comminuting the plastic materials to form plastic particles; purifying the plastic particles;
feeding the comminuted and purified plastic materials to an intermediate storage for assuming a substantially dry state;
moving the dry plastic particles from the intermediate storage onto a heated moving steel tape to form a thin layer on the heated moving steel tape, wherein the temperature of the steel tale is set such that the plastic particles, having a lower softening point, adhere to the surface of the steel tape, and wherein the temperature is such that the plastic particles, having a higher softening point, can freely move over the particles adhering to the steel tape;
rapidly and asymmetrically accelerating the steel tape for transporting the freely moving particles in a direction opposite to the acceleration direction;
subjecting the freely moving particles to a separating force for separating the freely moving particles from the support base;
collecting the freely moving particles after separation from the support base;
scraping the adhering particles from the steel tape.

13. The method according to claim 12, further comprising moving a support base along a closed path; and heating the support base from the inside of the support base.

14. The method according to claim 12, further comprising irradiating the support base with infrared radiation for increasing the temperature of the support base.

15. The method according to claim 12, further comprising maintaining the direction of motion of the freely moving particles substantially opposite to the motion of the support base with the adhering particles such that a counter-current separation process occurs between the adhering and the non-adhering particles.

* * * * *